A. DUCKWORTH.
ATTACHMENT FOR SPINNING FRAMES.
APPLICATION FILED JAN. 28, 1908.
903,063.
Patented Nov. 3, 1908.
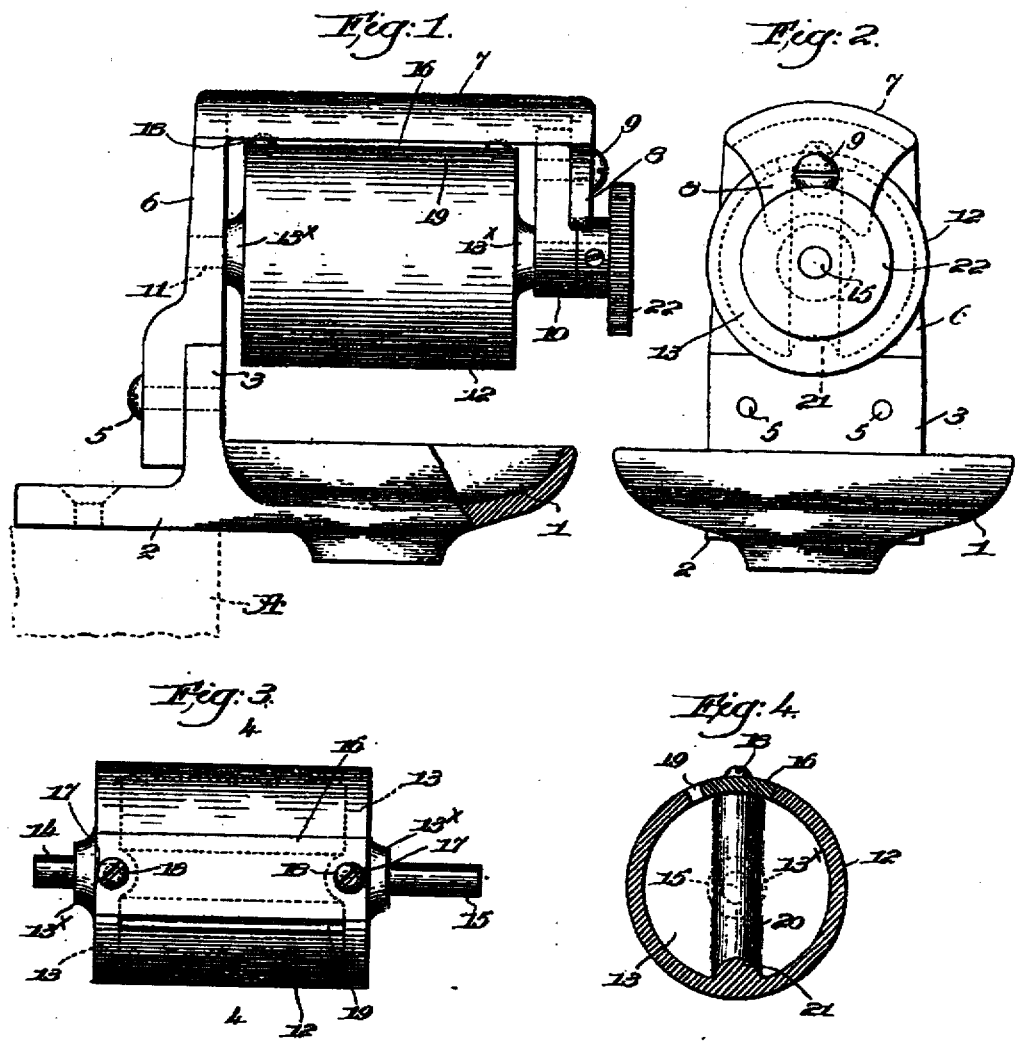
Witnesses
Edward F. Allen
Joseph M. Ward
Inventor
Albert Duckworth
By Crosby & Gregory
Attys.

UNITED STATES PATENT OFFICE.

ALBERT DUCKWORTH, OF LOWELL, MASSACHUSETTS, ASSIGNOR TO DRAPER COMPANY, OF HOPEDALE, MASSACHUSETTS, A CORPORATION OF MAINE.

ATTACHMENT FOR SPINNING-FRAMES.

No. 903,063.

Specification of Letters Patent.

Patented Nov. 3, 1908.

Application filed January 28, 1908. Serial No. 413,119.

*To all whom it may concern:*

Be it known that I, ALBERT DUCKWORTH, a citizen of the United States, and resident of Lowell, county of Middlesex, State of Massachusetts, have invented an Improvement in Attachments for Spinning-Frames, of which the following description, in connection with the accompanying drawing, is a specification, like letters on the drawing representing like parts.

This invention has for its object the production of an attachment for spinning-frames designed to hold in bulk travelers used on the rings of the frames, the travelers being contained in a suitable holder which can be moved manually to discharge a few of the travelers into a shallow cup or pan from which they are removed as needed. By means of this device the travelers are kept in bulk in a convenient place on the spinning-frame and waste in their use is prevented.

The various novel features of the invention will be fully described in the subjoined specification and particularly pointed out in the following claims.

Figure 1 is a side elevation of the attachment embodying one form of my invention, a portion of the cup or pan being broken out; Fig. 2 is a right hand elevation of the device shown in Fig. 1; Fig. 3 is a top plan view of the holder or hopper, showing the closure therefor and the outlet for the travelers when the holder is moved to discharging position; Fig. 4 is a cross-section of the holder on the line 4—4, Fig. 3.

In the present embodiment of my invention I provide a shallow cup or pan 1 having a lateral extension 2 and an upright, transverse ear 3 on the extension, the latter being adapted to be secured to a convenient part of the frame A, Fig. 1, of the spinning-frame by means of a screw inserted through a hole 4, see dotted lines Fig. 1, the cup or pan being thereby held in horizontal position.

Upon the ear 3 I secure by screws 5 the upright shank 6 of an overhanging and preferably transversely arched arm 7, extended above the pan and having its outer end downturned at 8. To said end I attach, as by a screw 9, a depending bearing 10 having its bore in horizontal alinement with a hole 11, see dotted lines Fig. 1, in the shank 6, for a purpose to be described.

A hopper or holder is herein shown as a cylinder 12, preferably a casting, having closed ends 13 and provided with journals 14, 15, which are rotatably inserted in the hole 11 and bearing 10, respectively, bosses 13ˣ on the ends of the hopper preventing undue endwise movement of the hopper. The cylinder is longitudinally slotted from end to end, and normally the opening thus formed is closed by a cover 16 notched at its ends at 17 to receive the shanks of retaining screws 18 which take into the end of the hopper, and the slot is widened along one edge to leave a narrow, elongated discharge opening 19, Figs. 1, 2 and 4.

The ends 13 may be thickened, as at 20, to form a better support for the screws, and a longitudinal rib 21 is formed on the interior of the hopper opposite the slot, to act as a counterbalance. That is, normally the counterweight will operate to retain the hopper in position with the discharge opening 19 uppermost and under the overhanging arm 7, and if the hopper is turned on its journals the counterweight will return it to normal position as soon as released. A thumb-nut 22 is preferably secured to the projecting end of the longer journal 15, by means of which the hopper can be conveniently turned. The cover 16 is removed and the hopper is filled with a quantity of travelers, in bulk, after which the cover is replaced and fastened.

When the spinner requires one or more travelers he grasps the nut 22 and revolves the hopper 12 to turn the discharge opening 19 downward, whereupon one or more travelers will drop out into the pan, but only a few of the travelers at most will be discharged, owing to the character of the opening 19.

The discharged travelers are picked out of the pan and used as needed, the bulk of the travelers being retained in the hopper and kept thereby from scattering or spilling over the floor.

As only a few of the travelers will be held in the pan 1 at any time the operative will be more careful in their use and will not have the opportunity to waste them, as is now the case.

The bearing 10 is detachably secured to the end 8 of the overhanging arm in order to readily assemble the parts of the device, the journals 14 and 15 being fixedly secured to the hopper.

The overhanging arm protects the discharge opening from the entrance of lint and fluff.

Having fully described my invention, what I claim as new and desire to secure by Letters Patent is:—

1. In an attachment for spinning-frames, a shallow, horizontal pan having an attaching extension, means connected with and located above the pan to rotatably sustain a cylindrical hopper at the centers of its ends, said hopper being adapted to receive travelers in bulk and having an elongated and narrow discharge opening of fixed width, a cover detachably secured to the hopper and forming one edge of the discharge opening, by removal of which cover the hopper may be filled, and means to normally maintain the hopper with its discharge opening inoperative.

2. In an attachment for spinning-frames, a cylindrical hopper to receive travelers in bulk and manually rotatable about a central horizontal axis and having a slot-like, elongated discharge opening of fixed width in its side, means to normally retain the hopper with its discharge opening uppermost, a pan beneath the hopper, and an arm mounted on the pan and overhanging the hopper, said arm protecting the discharge opening from the entrance of lint when the hopper is normally positioned.

In testimony whereof, I have signed my name to this specification, in the presence of two subscribing witnesses.

ALBERT DUCKWORTH.

Witnesses:
GEORGE D. KIMBALL,
ARNOLD A. BYAM.